United States Patent
Schechner et al.

(10) Patent No.: US 10,577,769 B2
(45) Date of Patent: Mar. 3, 2020

(54) SHORING SYSTEM FOR LAYING PIPE IN A TRENCH, SUPPORTING UNIT THEREFOR AND METHOD THEREFOR

(71) Applicant: NATURSPEICHER GMBH, Ulm (DE)

(72) Inventors: Alexander Schechner, Ulm (DE); Mario Lopez, Dischingen (DE)

(73) Assignee: Naturspeicher GmbH, Ulm (DE)

( * ) Notice: Subject to any disclaimer, the term of this patent is extended or adjusted under 35 U.S.C. 154(b) by 0 days.

(21) Appl. No.: 16/080,726

(22) PCT Filed: Feb. 8, 2017

(86) PCT No.: PCT/EP2017/052671
§ 371 (c)(1),
(2) Date: Aug. 29, 2018

(87) PCT Pub. No.: WO2017/148662
PCT Pub. Date: Sep. 8, 2017

(65) Prior Publication Data
US 2019/0093303 A1 Mar. 28, 2019

(30) Foreign Application Priority Data
Feb. 29, 2016 (DE) .......... 10 2016 103 534

(51) Int. Cl.
*E02D 17/08* (2006.01)
*F16L 1/028* (2006.01)
(Continued)

(52) U.S. Cl.
CPC .......... *E02D 17/086* (2013.01); *E02D 17/08* (2013.01); *F16L 1/028* (2013.01); *F16L 1/036* (2013.01); *F16L 1/10* (2013.01)

(58) Field of Classification Search
CPC ....... E02D 17/04; E02D 17/08; E02D 17/086; F16L 1/036; F16L 1/10
See application file for complete search history.

(56) References Cited

U.S. PATENT DOCUMENTS 3,212,270 A * 10/1965 Benintend .............. E02D 17/08
405/272
3,541,799 A * 11/1970 Jost ........................ E02D 17/086
405/283
(Continued)

FOREIGN PATENT DOCUMENTS

| DE | 2364502 A1 | 7/1981 |
|---|---|---|
| DE | 102006013410 | 9/2006 |

(Continued)

OTHER PUBLICATIONS

International Search Report (PCT/EP2017/052671), dated Apr. 11, 2017.
(Continued)

*Primary Examiner* — Sean D Andrish
(74) *Attorney, Agent, or Firm* — Dority & Manning, P.A.

(57) ABSTRACT

A system for shoring a trench, which is dug for receiving a pipeline and includes spaced apart sidewalls, includes at least two supporting units that are spaced apart from one another in the longitudinal direction of the trench and configured for absorbing transverse forces from the sidewalls. Disposed between the two supporting units is a plurality of shoring units, each configured for supporting the sidewalls of the trench. Together with the supporting units, the shoring units are configured to form a barrier-free lowering space within which the pipe can be lowered into the trench from outside the trench to the floor of the trench. A method for laying a pipe using the shoring system is also disclosed.

18 Claims, 7 Drawing Sheets

(51) Int. Cl.
*F16L 1/10* (2006.01)
*F16L 1/036* (2006.01)

(56) References Cited

U.S. PATENT DOCUMENTS

| | | | | |
|---|---|---|---|---|
| 3,785,160 A | * | 1/1974 | Banjavich | B23K 5/22 |
| | | | | 405/170 |
| 6,224,296 B1 | * | 5/2001 | Fukumori | E02D 17/08 |
| | | | | 405/272 |

FOREIGN PATENT DOCUMENTS

| | | | |
|---|---|---|---|
| DE | 102006018581 | * | 7/2007 |
| DE | 102006019236 A1 | | 11/2007 |
| GB | 2272921 | | 6/1994 |
| JP | S 6078016 A | | 5/1985 |

OTHER PUBLICATIONS

German Search Report (102016103534.3) dated Dec. 6, 2016.
English translation of EPO IPRP (PCT/EP2017/052671) dated Sep. 13, 2018.
EPO Office Action (17704222.3) dated Apr. 11, 2018.

* cited by examiner

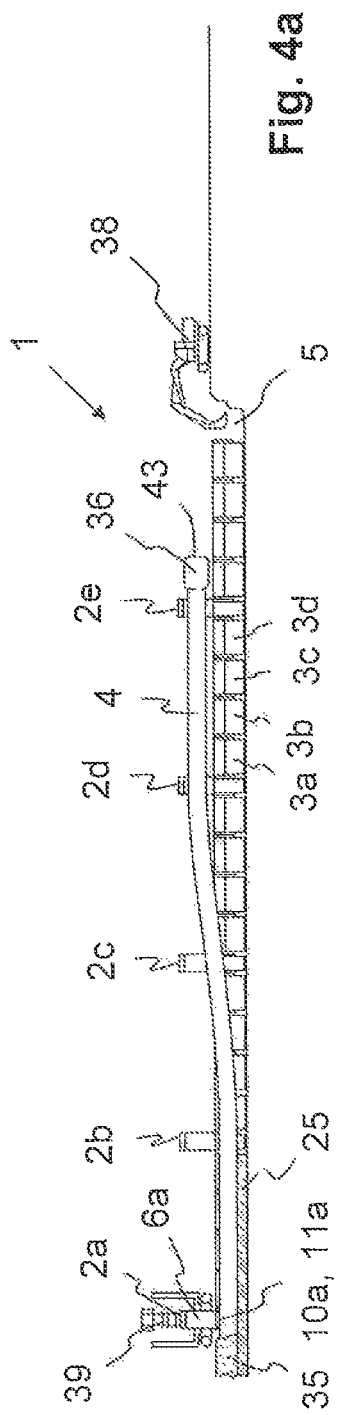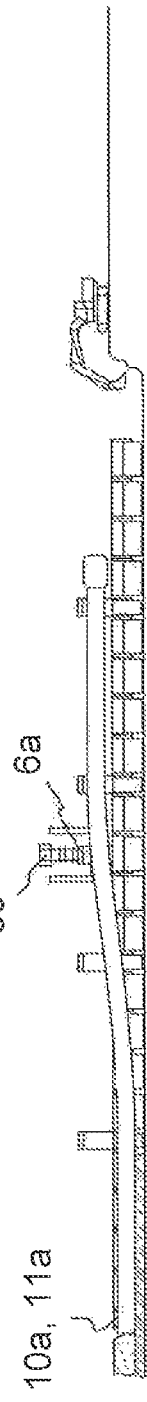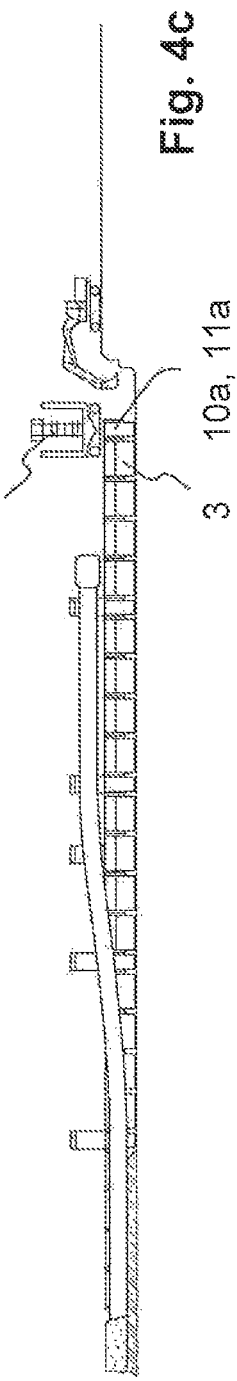

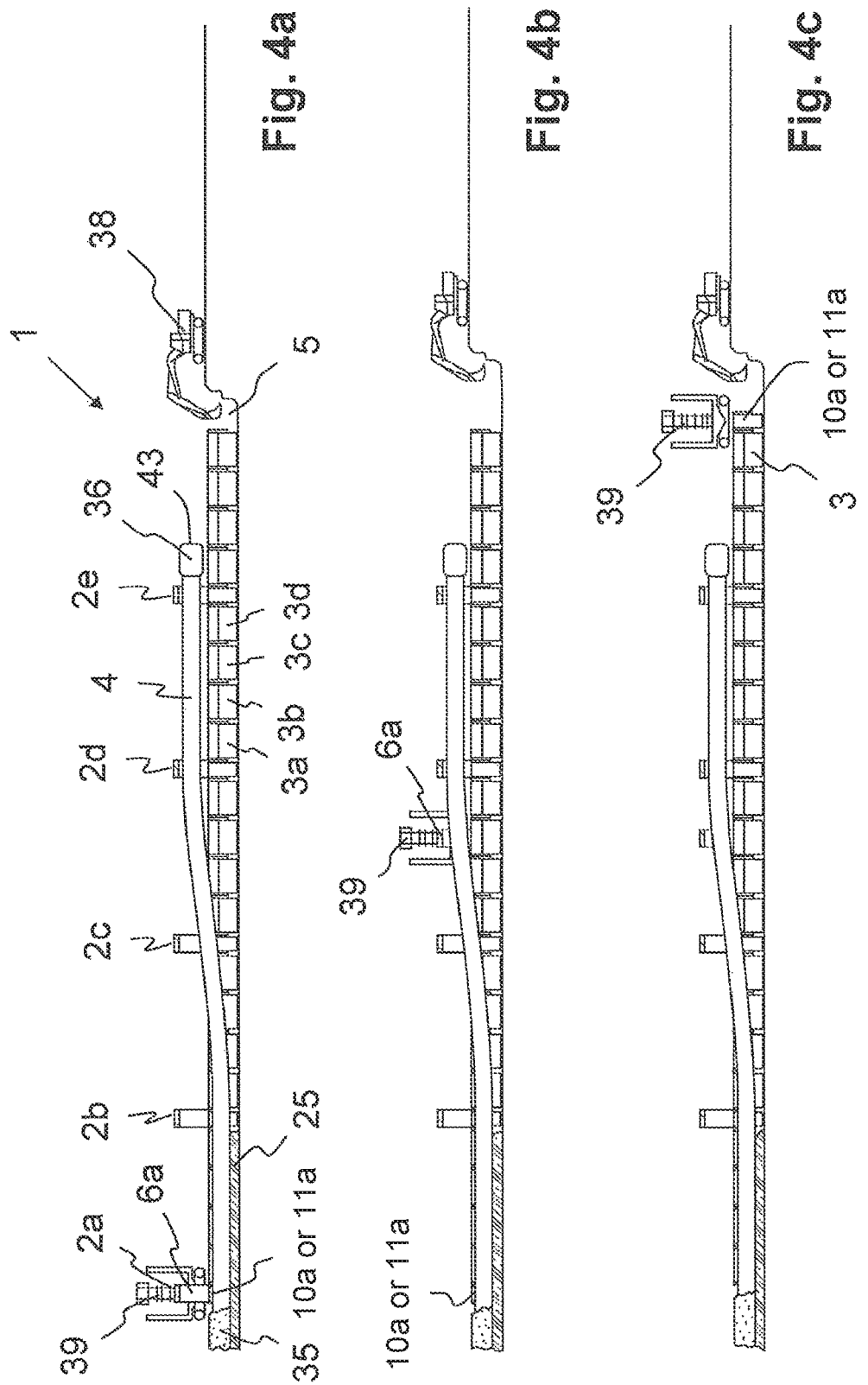

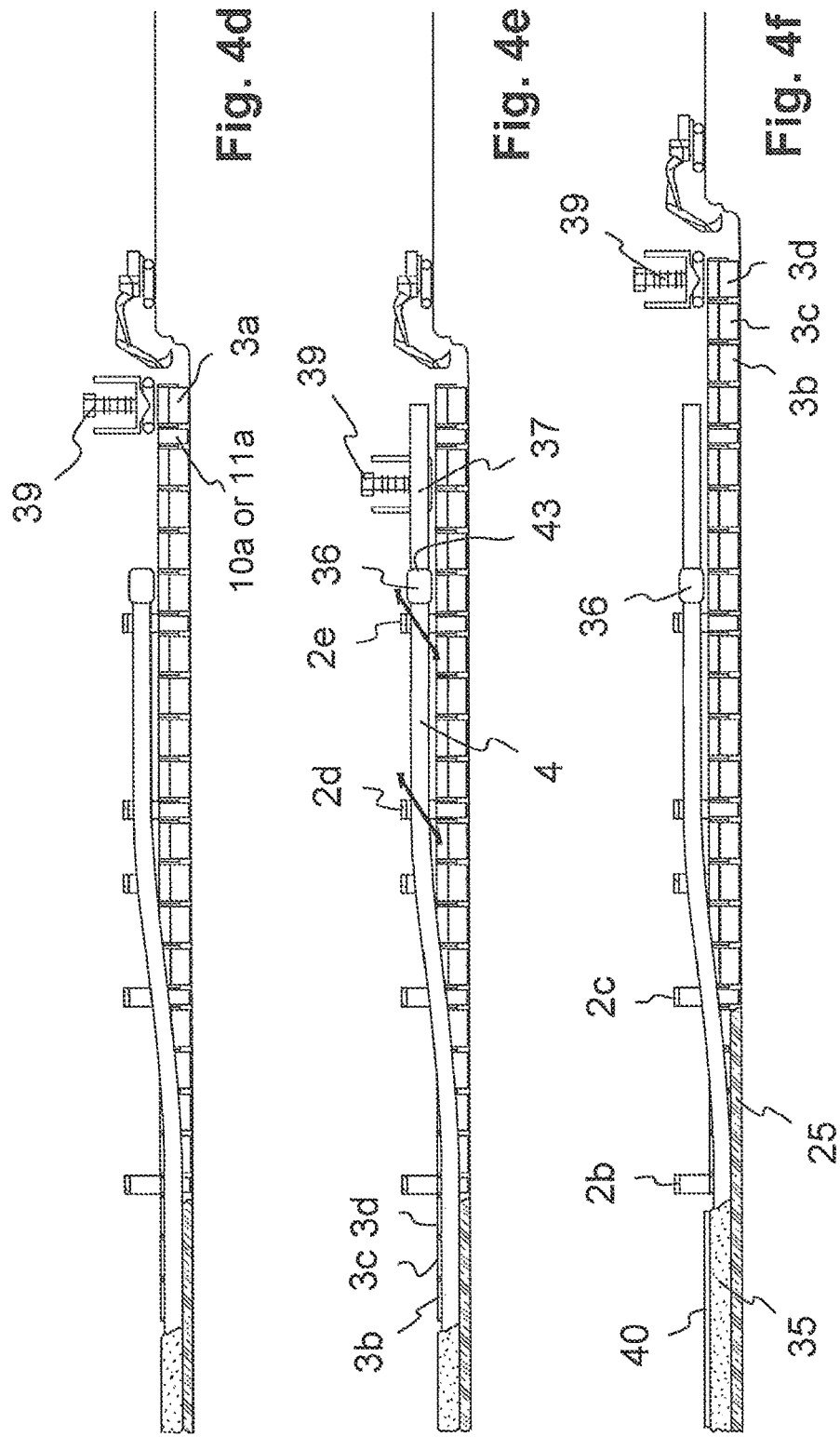

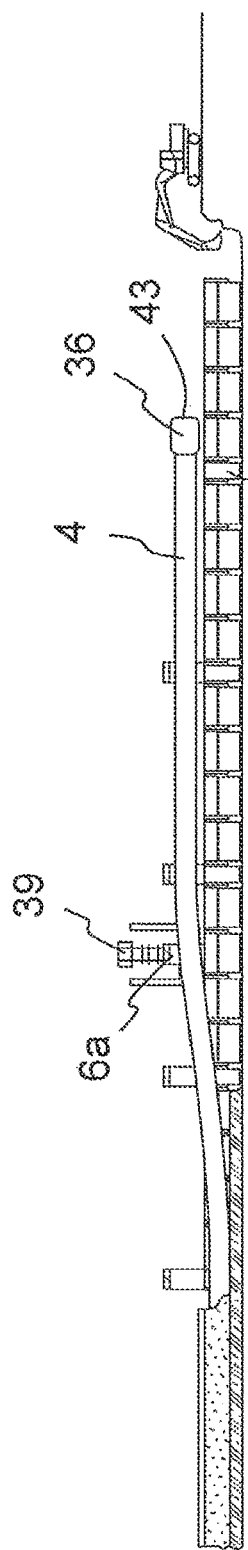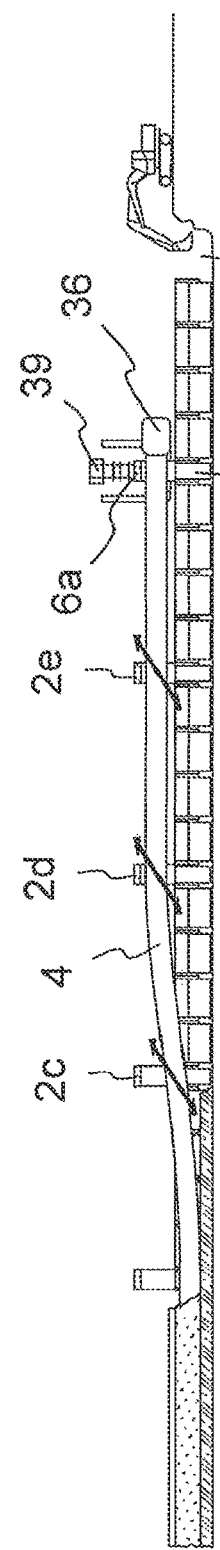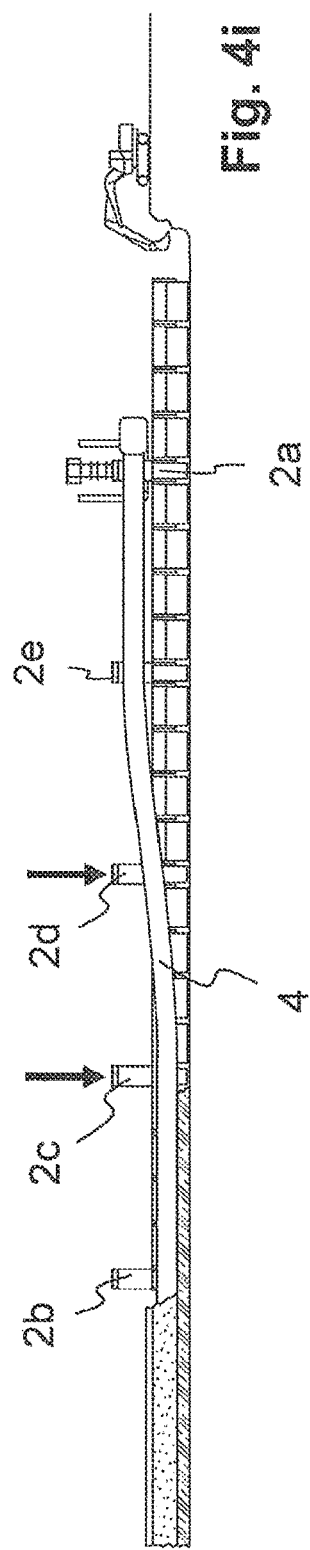

SHORING SYSTEM FOR LAYING PIPE IN A TRENCH, SUPPORTING UNIT THEREFOR AND METHOD THEREFOR

CROSS-REFERENCE TO RELATED APPLICATIONS

This application claims priority to International Application Serial No. PCT/EP2017/052671, filed Feb. 8, 2017, which claims priority to German Application No. 10 2016 103 534.3, filed Feb. 29, 2016. International Application Serial No. PCT/EP2017/052671 is hereby incorporated herein in its entirety for all purposes by this reference.

FIELD OF THE INVENTION

The present invention relates to a self-supporting shoring system, which can be situated at least partially outside a trench and extends, in the intended shoring position, like a bridge over a pipe which can be situated outside and/or above the trench and can be lowered into the trench. Moreover, the present invention relates to a method for laying a pipe, in particular a flexible plastic pipe, with the aid of a shoring system of this type.

BACKGROUND OF THE INVENTION

DE 236 45 02 C3 describes a device for laying heavy pipeline pipes having a large diameter into a prepared, long trench. The device comprises a line of rails which can be laid in the longitudinal direction of the trench and includes a pipe support frame which is rail-guided on the line of rails and comprises lifting devices. The device comprises a stand which is set up like a bridge over the trench and comprises foldable and movable trestles and hanging pipe support frames. The stand further comprises a line of rails which has been laid from the point of a pipe rack and comprises an integrated pipe welding station which can be laid in the longitudinal direction of the trench. The end of the line of pipe is held at the working height of the welding cabin in order to be welded to another end of a line of pipe. Thereafter, the entire line of pipe is lowered, progressively along the length, or simultaneously in full length, to the trench floor. It is disadvantageous in this case is that the trench does not have a shoring system which protects the trench from sloughing soil. Due to health and safety regulations, work in the interior of the trench is therefore not possible.

Moreover, DE 10 2006 019 236 B4, for example, describes a device for trench shoring, which comprises a pair of shoring plates which are positioned opposite one another and are inserted into the trench. These diametrically opposed shoring plates are secured with respect to one another with the aid of multiple expansion pipes. It is disadvantageous in this case that, due to the necessary expansion pipes or transverse braces, a pipe extending across several such shoring units cannot be lowered to the trench floor.

BRIEF OBJECTS AND SUMMARY OF THE INVENTION

The problem addressed by the present invention is therefore that of providing a supporting unit, a shoring system, as well as a method for laying a pipe, which eliminates the aforementioned problems.

The invention relates to a supporting unit for a self-supporting shoring system comprising a supporting frame which can be situated at least partially outside a trench. In the intended shoring position, this supporting frame extends like a bridge over a pipe which can be situated outside and/or above the trench and can be lowered into the trench. The pipe intended therefor can therefore be accommodated in the interior of the supporting frame before being lowered. The supporting unit comprises two supporting walls which can be situated at least partially in the interior of the trench and are spaced apart from one another in the transverse direction of the supporting unit. The supporting walls can be designed in such a way that the supporting walls prevent a lateral sloughing of the soil by way of the supporting walls supporting the soil towards the outside. The two supporting walls each adjoin one of the two ends of the supporting frame. The supporting frame and the two supporting walls form, together, a barrier-free lowering space. Therefore, no transverse braces extend within this lowering space, which would obstruct a lowering of the pipe. Due to the barrier-free lowering space, the pipe intended therefor can therefore be lowered, within this lowering space, from the area of the supporting frame into the area of the supporting walls. Moreover, the supporting unit is therefore, advantageously, a self-supporting system which can absorb the transverse forces acting on the supporting walls by way of the soil. For this purpose, the supporting frame preferably has sufficiently high rigidity, and so the supporting walls are held in position despite the transverse forces acting on the supporting walls by way of the soil.

It is advantageous when the supporting frame forms, together with the supporting walls situated in extension of the legs of the supporting frame, a supporting structure which is open only on the floor side. This supporting structure therefore includes an opening exclusively on the floor side, which extends, in particular essentially, across the width of the trench.

In the case of very deep trenches, it is advantageous for even greater rigidity when the supporting unit comprises a support brace, in particular a wooden brace. The support brace is preferably situated in the area of the opening of the supporting structure or, on the trench floor-side, in the area of the ends of the two supporting walls facing away from the supporting frame. The support brace extends in the transverse direction of the supporting unit between these two supporting walls. The support brace is preferably braced between the two supporting walls in a force-locked manner. Therefore, the supporting frame of the supporting unit outside the trench and the support brace in the interior of the trench provide the rigidity necessary for absorbing very high transverse forces.

It is advantageous when the supporting frame and the supporting walls are displaceable. As a result, the supporting frame and the supporting walls can be reused in an upstream area of the trench.

In order to facilitate the displacement of the supporting unit, it is advantageous when the support brace is designed as an expendable brace. In this case, the support brace remains in the trench, when used as intended, and is buried together with the laid pipe.

In one advantageous refinement of the invention, the supporting walls each include a first support surface. This first support surface is utilized for placing the particular supporting wall on the trench edge, and so the supporting wall can enter the trench only up to a defined depth. With the aid of the first support surface, it is further ensured that the particular supporting wall always overhangs slightly over the trench opening, and so the supporting wall can be safely detachably fastened to the corresponding supporting frame outside the trench. Preferably, this first support surface is situated on the side of the supporting wall facing away from the lowering space. Additionally or alternatively, this first support surface is situated in the area of the end of the particular supporting wall facing the supporting frame. Preferably, the supporting walls therefore have an essentially L-shaped main body or cross-section.

It is advantageous when the supporting walls are each designed as two pieces and/or when the two parts can be displaced, in particular in a rail-guided manner, with respect to one another in the vertical direction of the trench. Preferably, the first part includes the first support surface, and so this first part can be supported on the trench edge. The second part can therefore be gradually lowered as the trench is excavated to a deeper and deeper extent.

In order to enable the supporting frame and the supporting walls to be moved separately from one another, it is advantageous when the supporting frame is placed onto the two supporting walls and/or is detachably connected thereto in a particular connection area. The supporting frame is preferably screwed to the two supporting walls. Additionally or alternatively, a form-locking connection can be formed between the two. The supporting frame can therefore be moved separately from the supporting walls.

It is advantageous when the supporting unit comprises a lowering device, with the aid of which the pipe can be lowered into the trench. The lowering device is preferably situated on the supporting frame. Moreover, it is advantageous when the lowering device is displaceable in relation to the supporting frame in the transverse direction of the supporting unit. Additionally or alternatively, it is advantageous when the lowering device preferably comprises an, in particular, flexible and/or adjustable-length lift belt. As a result, the pipe, which is held above the trench, can be lowered from the area of the supporting frame into the area of the two supporting walls. The lowering device can be further designed in such a way that the pipe can be raised from a lowered position back into a raised position. The lowering device can be motor-driven for this purpose.

So far, the trench into which the pipe is to be lowered had to be designed to be very wide when the planned pipe course is not designed to be straight, but rather curved. In order to reduce the excavation effort and, consequently, to allow the trench to be designed as narrow as possible, it is advantageous when the supporting unit comprises an alignment device, with the aid of which the pipe to be laid can be displaced in relation to the supporting unit or the trench in the transverse direction before the lowering, i.e., outside the trench, in order to be aligned in relation to the trench. As a result, the pipe can be curved in one area, with the aid of the alignment device, in such a way that its course corresponds to the planned pipe-laying course. Consequently, the trench can be designed to be very narrow. The alignment device can be further utilized for aligning the free pipe end, before lowering, in the transverse direction in relation to a further pipe section to be connected, in particular, to be welded. Preferably, the alignment device is hydraulically operated. Moreover, it is advantageous when the alignment device is situated on the supporting frame. As a result, the pipe can be pressed into the correct position already before the lowering, and so the pipe is in the desired position directly above the trench opening and can be easily inserted into the trench opening when lowered.

In one advantageous refinement of the invention, the supporting frame comprises two legs, the free ends of which are each assigned to one of the two supporting walls and/or are detachably connected thereto. Moreover, it is advantageous when a transverse element is situated between the two legs at their ends facing away from the supporting walls and extends between the two. The supporting frame can comprise an essentially U-shaped main body. The main body can be designed to be curved, wherein, preferably, in this case, the transverse element is formed in the area of the curve, or the main body can have an angular shape, wherein, preferably, in this case, the two legs and the transverse element form one side of the supporting frame in each case.

In one advantageous refinement of the invention, the alignment device comprises two pressure pistons which face one another and/or are displaceable in the transverse direction of the supporting unit. In order to align the pipe in the transverse direction, the pressure pistons are each displaceable from a neutral position, which is withdrawn from the lowering space, into a pressure position which is displaced further into the lowering space. In the pressure position, the particular pressure piston comes into contact with the outer side of the pipe and can move the pipe in the transverse direction. In order to avoid damaging the pipe, it is advantageous when the pressure pistons each include a pressure surface which preferably has a concave shape adapted to the outer contour of the pipe, and so the pressure transmitted via the pressure piston onto the pipe is uniformly distributed. The pressure surface advantageously extends in the vertical direction from the area of the supporting frame into the connection area between the supporting frame and the supporting walls. The pressure surface can terminate above the connection area or at the level of the connection area. The pressure surface can extend across the connection area, however, into the area of the supporting walls. As a result, the pipe is reliably guided, during lowering, by the pressure surfaces into the trench opening.

It is advantageous when, in the neutral position of the two pressure pistons, the distance between the two pressure surfaces is greater in the transverse direction of the supporting unit than the distance between the two supporting walls.

The invention further relates to a shoring system for trench shoring for a lowerable pipe. The shoring system comprises at least two supporting units which are spaced apart from one another in the longitudinal direction of the shoring system. The supporting units can absorb transverse forces which act on the shoring system by way of the soil pressing inward. Moreover, the shoring system comprises at least one shoring unit which is situated between these two supporting units and is intended for supporting the trench wall. The shoring system is designed to be self-supporting with the aid of the supporting units. For this purpose, the supporting units are preferably designed according to the preceding description, wherein the aforementioned features can be present individually or in any combination. The supporting units form, together with the at least one shoring unit, a barrier-free lowering space. The lowering space preferably extends across the entire length of the shoring system. As a result, the pipe intended therefor can be lowered, within the lowering space, from an area located outside the trench essentially to the trench floor. Moreover, due to the trench shoring, it is now possible, with consideration for the health and safety regulations, for workers to be situated in the interior of the trench before, during, and/or after the lowering of the pipe.

It is advantageous when the shoring unit is displaceable, and so the shoring unit can be transported, during the progressive laying of the pipe, from the rear end of the shoring system to the front end of the shoring system. As a result, advantageously, only a limited number of shoring units and/or supporting units is necessary in order to lay the pipe along its entire planned laying course.

In order for the shoring system to be designed to be self-supporting also in the area of the shoring units, it is advantageous when the shoring units are each detachably connected, in the area of their two end faces, to the particular adjacent supporting unit or to the particular adjacent additional shoring unit. The shoring unit preferably comprises no transverse braces, in order to ensure the barrier-free lowering space. Due to the detachable connection in the area of its end faces, the transverse forces acting on the shoring unit by way of the soil are diverted to the supporting units, and so the shoring system is designed to be self-supporting.

In one advantageous refinement of the invention, the shoring unit comprises two shoring walls which can be at least partially situated in the interior of the trench. The shoring walls are situated opposite one another and/or are spaced apart from one another in the transverse direction of the shoring unit. The two shoring walls of the particular shoring unit are completely separated from one another, i.e., they have no transverse connection or transverse brace in the area of the lowering space. It is conceivable, however, that the shoring unit comprises at least one expendable transverse brace outside the lowering space, in particular on the floor side, similarly to the supporting unit.

Due to the fact that the two diametrically opposed shoring walls are completely separated from one another in the area of the lowering space, the shoring walls would tip over due to the sloughing soil without additional means. In order to enable the transverse forces acting on the shoring walls to be diverted into the supporting units, it is therefore advantageous when the shoring walls are each detachably and/or form-lockingly connected, in the area of their end-face impact surfaces, to the particular adjacent in the longitudinal direction of the shoring system supporting wall of an adjacent supporting unit, and/or to the adjacent shoring wall of an adjacent shoring unit. As a result, each of the shoring walls is held by the particular walls which are adjacent in the longitudinal direction.

In order to enable the shoring walls to be lowered, at the most, to the trench floor, it is advantageous when each of these shoring walls includes a second support surface, with the aid of which the shoring walls can be placed on the trench edge. Preferably, this second support surface is situated on the side facing away from the lowering space and/or in the area of the end of the particular shoring wall facing the trench opening. The shoring walls of the shoring unit preferably have an essentially L-shaped main body or cross-section.

It is advantageous when the shoring walls each comprise two shoring plates which are displaceable with respect to one another in the vertical direction of the shoring system. In this regard, it is further advantageous when the two shoring plates are guided by two end-face guide rails. Additionally or alternatively, it is further advantageous when one of the two shoring plates includes the second support surface for the support on the trench edge. During deeper excavation of the trench, the other of the two shoring plates can therefore slide, in relation to the first shoring plate, further into the trench, and so the trench is completely supported immediately after the excavation.

In one advantageous refinement of the invention, the shoring system comprises at least two supporting units for aligning the pipe in relation to the trench before the lowering. Moreover, it is advantageous when the shoring system comprises at least two, in particular, four additional supporting units in order to align the pipe end with respect to a pipe section to be connected thereto. In order to support the trench, it is further advantageous when 3 to 4 shoring units are situated between every two mutually adjacent supporting units.

The invention further relates to a method for laying a pipe, in particular a flexible plastic pipe, according to which a trench is excavated along a trench course. The trench course can include bends which the pipe must follow. In the method according to the invention, a shoring system comprising multiple displaceable supporting units and shoring units is introduced. The shoring system, in particular the supporting units, is preferably designed according to the preceding description, wherein the aforementioned features can be present individually or in any combination. The pipe is lowered, in a lowering section, within a barrier-free lowering space of the shoring system, from a lift position essentially to the trench floor. Simultaneously, the pipe is held, in the area of the pipe end, in the lift position in a holding section. As a result, further pipe sections can be advantageously welded onto the pipe at the pipe end outside the trench, which has not yet been lowered. Consequently, no workers need to enter the trench for this work. Regardless thereof, due to the shoring system introduced into the trench, workers can advantageously be in the trench before, during, and/or after the lowering of the pipe in the corresponding lowering section, however, since the trench is secured by way of the shoring system.

It is advantageous when the supporting units and shoring units situated in the lowering section are moved into the holding section after the pipe has been lowered. As a result, the shoring system does not need to extend across the entire length of the planned pipe course, but rather only across a subsection. The particular units of the shoring system can therefore be gradually moved in the direction of the further trench course. In doing so, the supporting unit or shoring unit forming the rear end of the shoring system is preferably gradually moved to the front end of the shoring system in each case. While the supporting unit or the shoring unit at the rear end of the shoring system is being moved, the trench can be further excavated, in the meantime, at the front end of the shoring system, in order to accommodate the unit which has been moved. During the utilization of the unit at the front end of the shoring system, furthermore, the trench can be filled, essentially simultaneously, at the rear end of the shoring system, with the pipe lowered therein. As a result, the pipe can be laid in a highly time-efficient and, therefore, cost-effective manner.

In one advantageous refinement of the invention, during the displacement of the supporting unit, a supporting frame of the supporting unit is initially moved into an intermediate parking position. This intermediate parking position is preferably located behind a welding unit or welding machine in the longitudinal direction of the shoring system. It is advantageous when, after the displacement of the supporting frame, the two supporting walls of the supporting unit ahead of the welding machine are moved to the front end of the shoring system. In this regard, it is further advantageous when, after the displacement of the two supporting walls, the supporting frame is moved out of its intermediate parking position to the two supporting walls, in particular after the welding machine has welded a further pipe section to the free pipe end and has been moved further to the new pipe end. As a result, an obstruction by the supporting unit during the displacement of the welding machine can be advantageously avoided.

It is advantageous when the pipe of at least one supporting unit situated in the lowering section is aligned in relation to the trench course in the transverse direction of the trench with the aid of an alignment device before the lowering. The alignment device is preferably designed according to the preceding description with respect to its configuration and mode of operation, wherein the aforementioned features can be present individually or in any combination. As a result, the trench needs to be excavated only slightly wider than the pipe to be laid, since the pipe can be adapted to the trench course by way of appropriate bending.

Moreover, it is advantageous when the trench is excavated ahead of the shoring system and is filled again behind the shoring system.

BRIEF DESCRIPTION OF THE DRAWINGS

Further advantages of the invention are described in the following exemplary embodiments. Wherein:

FIGS. 4a-4i show a lateral half-representation of the shoring system in the individual method steps for laying a pipe.

DETAILED DESCRIPTION

Figure 1A:
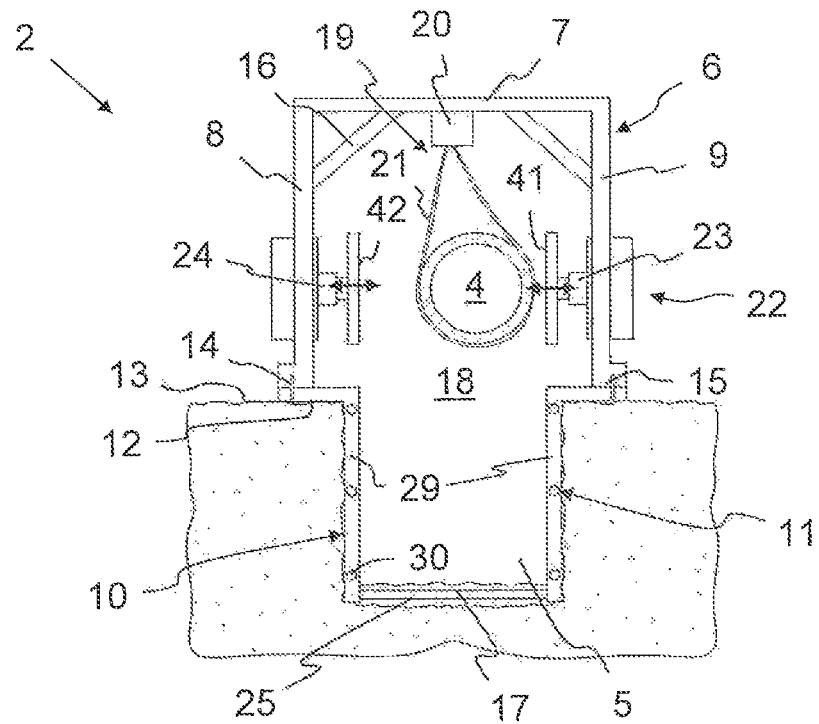
FIGS. 1a-1c show a schematic representation of a supporting unit of a shoring system comprising an alignment device for aligning the pipe, which is to be laid, in relation to the trench in the transverse direction, in the method steps of the alignment and the lowering of the pipe.
Figure 2:
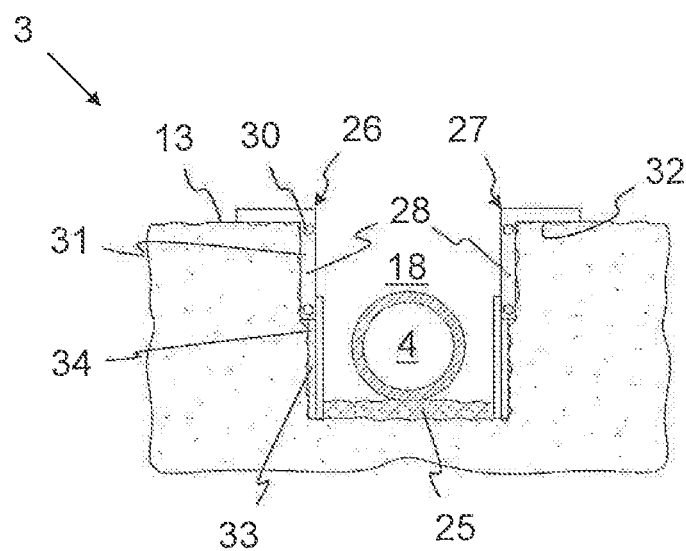
FIG. 2 shows a schematic representation of a shoring unit of a shoring system.
Figure 3:
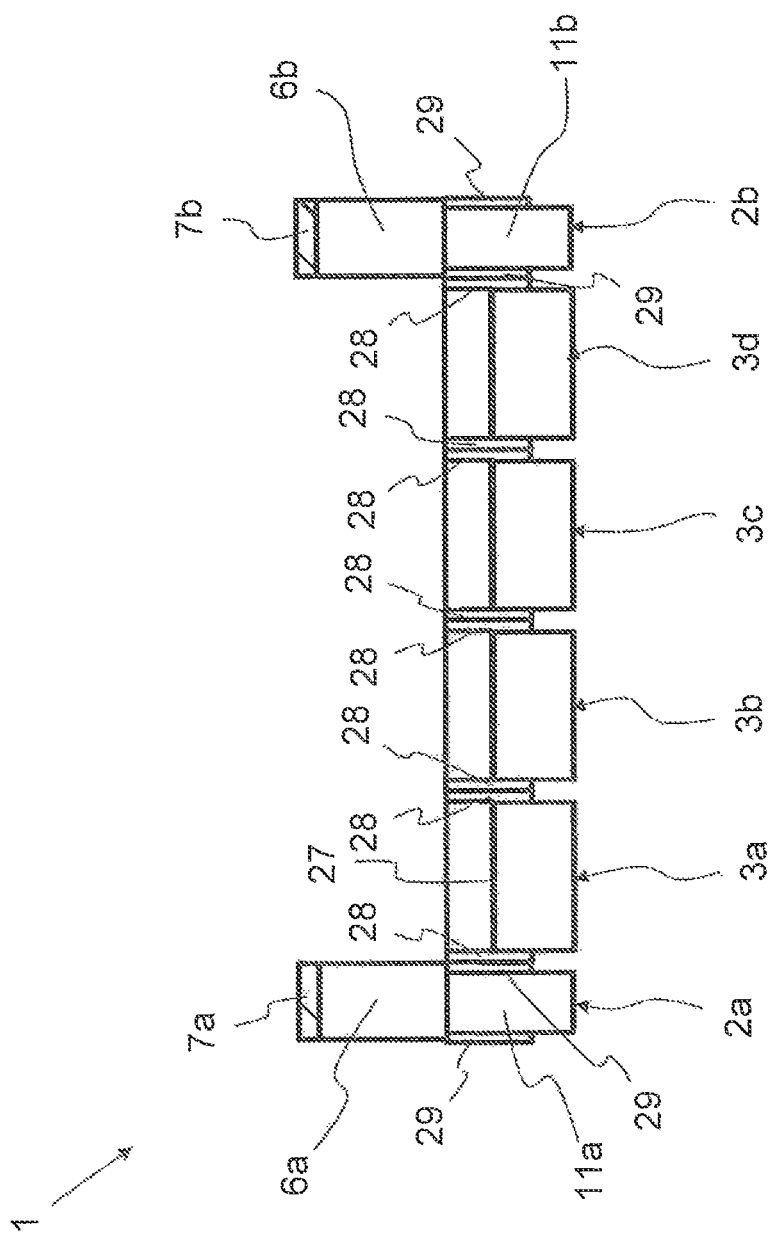
FIG. 3 shows a lateral half-representation of a shoring system comprising multiple supporting units and shoring units detachably connected to one another.

FIG. 3 shows a shoring system 1 for supporting a trench 5, comprising multiple supporting units 2a, 2b, which are represented in FIG. 1a, and multiple shoring units 3a-3d which are situated between these two supporting units 2a, 2b and are represented in FIG. 2.

According to FIG. 1a, the supporting unit 2 comprises a supporting frame 6. The supporting frame 6 is situated outside the trench 5 and extends like a bridge across the trench 5. A pipe 4, which has not yet been lowered in the trench 5, can therefore be accommodated in the area of the supporting frame 6, in the interior thereof. According to the present exemplary embodiment, the supporting frame 6 has an angular U-shape. The supporting frame 6 therefore comprises a transverse element 7 extending transversely over the trench 5, to each of the ends of which a leg 8, 9 is attached. Alternatively, the supporting frame 6 could also be designed as a gantry arch, and so the two legs 8, 9 each have a curvature at least in one subarea and/or transition via a curvature into the transverse element 7. The transverse element 7 could be designed as an arch element in this case.

In addition to the supporting frame 6, the supporting unit 2 also includes two supporting walls 10, 11 which are situated one on each side of the trench 5. The two supporting walls 10, 11 are therefore spaced apart from one another in the transverse direction of the trench, and so the pipe 4 can be lowered between these two supporting walls 10, 11. The supporting walls 10, 11 each include a first support surface 12, with the aid of which the supporting walls 10, 11 can be placed on the trench edge 13. As a result, the two supporting walls 10, 11 can each be introduced into the trench 5 up to a depth established by their particular first support surface 12.

The two supporting walls 10, 11 are therefore two components of the supporting unit 2, which are completely separated from one another. In order to enable the two supporting walls 10, 11 to absorb the transverse forces acting by way of the soil, the supporting walls 10, 11 are connected, in a connection area 14, 15, respectively, to the supporting frame 6 absorbing transverse forces. In order to enable the supporting frame 6 and the supporting walls 10, 11 to be moved separately from one another, the supporting frame 6 is detachably connected to the particular supporting wall 10, 11. The supporting frame 6 therefore forms, together with the two supporting walls 10, 11, a supporting structure which is open only in the area of the trench floor. The supporting structure is designed to be rigid such that the supporting structure can absorb the transverse forces acting on the supporting unit 2 by way of the soil.

In order to increase the rigidity, the supporting frame 6 can comprise additional reinforcements 16 which prevent an inward folding of the legs 8, 9 or of the supporting walls 10, 11 situated in extension of the legs 8, 9. The supporting unit 2 can comprise a support brace 17 in order to provide additional reinforcement in the area of the trench floor or the structure opening. The support brace 17 is situated in the area of the trench floor-side ends of the two supporting walls 10, 11. Preferably, the support brace 17 is a wooden brace, since the support brace is designed as an expendable support brace and remains in the trench 5 when the supporting unit 2 is moved. The support brace 17 is pressed between the two supporting walls 10, 11. Moreover, the support brace is covered with liquid soil 25 before the pipe 4 is lowered.

According to the preceding description, the supporting unit 2 is therefore designed to be self-supporting. In addition to this property, the supporting unit 2 also has a barrier-free lowering space 18. In the cross-sectional view represented in FIG. 1a, the lowering space 18 is formed in the interior of the supporting unit 2 and extends from the area of the supporting frame 6, i.e., outside the trench 5, into the area of the two diametrically opposed supporting walls 10, 11, i.e., into the interior of the trench 5. As a result, the pipe 4 can be brought from the position situated outside the trench 5, which is represented in FIG. 1a, within the barrier-free lowering space 18 into the lowered position into the trench 5, which is represented in FIG. 1c.

The supporting unit 2 comprises a lowering device 19 for holding, lowering, and/or raising the pipe 4. The lowering device 19 comprises a lift belt 21 which extends around the pipe 4. Moreover, the lowering device 19 comprises a drive 20, with the aid of which the length of the lift belt 21 can be changed in order to lower the pipe 4. The lowering device 19 is situated in the area of the transverse element 7. The lowering device 19 can be designed to be fixed in relation to the supporting frame 6 or can be displaceable in relation to the supporting frame 6 in the transverse direction of the trench. The lowering device 19 according to a first embodiment can be freely mounted, and so its position adapts to the pipe position. Alternatively, it is also conceivable, however, that the lowering device 19 can be displaced and/or locked in position in the transverse direction with the aid of a motor.

The laying course that the pipe is to follow is generally not straight across its entire length, but rather includes curves and bends. In order to keep the excavation effort to a minimum, it is advantageous when the trench 5 is excavated essentially following this curved laying course. It is problematic in this case, however, that the pipe 4 to be lowered, according to FIG. 1a, is then not situated over the trench 5, but rather is offset in relation thereto. This offset can be much greater than the represented offset, in particular so great that the pipe 4 is located completely next to the trench 5. In this case, the supporting frame would be proportioned correspondingly larger, in particular, would have a correspondingly greater width.

When the pipe 4 is offset in relation to the trench 5 by a correspondingly great extent in the transverse direction, the pipe 4 cannot be lowered into the trench 5. In order to enable the pipe 4 to be aligned in relation to the trench 5 in the transverse direction of the trench, the supporting unit 2 comprises an alignment device 22. The alignment device 22 is situated outside the trench 5 in the area of the supporting frame 6. The alignment device 22 comprises two diametrically opposed pressure pistons 23, 24 which can be displaced from a neutral position represented in FIG. 1a into a pressure position which is displaced further into the lowering space 18 (cf. FIG. 1b). The two pressure pistons 23, 24 each include a pressure surface 41, 42, respectively, via which a displacement force can be applied onto the pipe 4 in the transverse direction of the trench, and so the pipe position can be changed in the transverse direction of the trench. The pressure surfaces 41, 42 are spaced apart from the supporting walls 10, 11 in the vertical direction. Alternatively, the pressure surfaces 41, 42 could also terminate at the supporting walls 10, 11, however, or extend partially into the trench.

According to the example represented in FIG. 1a, the pipe 4 has been displaced to the right in relation to the trench 5. In order to bring the pipe 4 back into position, according to FIG. 1b, the first pressure piston 23 of the alignment device 22 is displaced from its neutral position represented in FIG. 1a into the pressure position represented in FIG. 1b. In doing so, the first pressure piston 23 is displaced into the lowering space 18 as far as necessary for the pipe 4 to be aligned with respect to the trench 5. Thereafter, the pipe 4 is lowered into the trench with the aid of the lowering device 19, according to FIG. 1c. During the lowering, the aligned position of the pipe 4 is maintained with the aid of the alignment device 22 and the pipe 4 is guided, with the aid of the pressure surface 41, in the vertical direction to the trench opening, and so the pipe 4 is inserted into the trench opening. Thereafter, the pressure piston 23 can be returned to its neutral position, according to FIG. 1c. In order to safely insert the pipe during lowering, it is advantageous when the pressure surfaces 41, 42 of the pressure pistons 23, 24 extend essentially to the trench opening in the vertical direction of the supporting unit 2. As a result, a safe hand-off from the pressure piston 23, 24 to the supporting walls 10, 11 can take place.

After the pipe 4 has been lowered to the trench floor, the lift belt 21 is removed from the pipe 4. Thereafter, the supporting unit 2 can be moved to a position which is further upstream in relation to the planned pipe course. For this purpose, the supporting frame 6 is first detached from the two supporting walls 10, 11 and is lifted off thereof with the aid of a transport device, in particular a displaceable gantry crane or a transport vehicle, and is transported to the new position. Thereafter, each of the two supporting walls 10, 11 is removed from the trench 5 and is moved to the new position. Only the support brace 17 remains in the interior of the trench 5 and is buried together with the pipe 4.

FIG. 2 shows one of the shoring units 3a-3d of the shoring system 1. The shoring unit 3 comprises a first shoring wall 26 which is situated on the one side of the trench 5, and a second shoring wall 27 which is situated on the opposite side of the trench 5. The two shoring walls 26, 27 are spaced apart from one another in the transverse direction of the trench and form, between themselves, a barrier-free lowering space 18 extending from the trench opening to the trench floor. The two shoring walls 26, 27 therefore do not comprise any support braces within the barrier-free lowering space 18 for absorbing transverse forces.

In order to prevent the two shoring walls 26, 27 from being pressed into the barrier-free lowering space 18 by sloughing soil, the shoring walls 26, 27 each include a first fastening area 28 on their two end faces. In this first fastening area 28, each of the two shoring walls 26, 27 is detachably connectable to a particular adjacent shoring wall of an adjacent shoring unit 3 or an adjacent supporting wall 10 of an adjacent supporting unit 2. For this purpose, the supporting units 2, in particular the two supporting walls 10, 11, according to FIG. 1a, include, on their end faces, a particular second fastening area 29 corresponding to the first fastening area 28. The supporting units 2 and the shoring units 3 comprise multiple fasteners 30 in their particular fastening areas 28, 29, and so the fastening areas 28, 29 can be detachably connected to one another on their end faces. The first shoring wall 26 is therefore held in the transverse direction by way of the end-face connection to the adjacent first supporting wall 10. Similarly, the second shoring wall 27 of the shoring unit 3 is held by the second supporting wall 11 via the end-face, detachable connection therebetween.

According to FIG. 2, each of the two shoring walls 26, 27 comprises a first shoring plate 31 on the trench-opening side. Moreover, each of the two shoring walls 26, 27 includes a second support surface 32, with the aid of which the particular shoring wall 26, 27 can be placed on the trench edge 13. The second support surface 32 is situated at the first shoring plate 31, and so the shoring plate 31 can enter the trench 5 up to a depth defined by the second support surface 32.

In addition to the first shoring plate 31, each of the two shoring walls 26, 27 comprises a second shoring plate 33. The second shoring plate 33 is displaceable in the vertical direction with respect to the assigned first shoring plate 31. As a result, the second shoring plate 33 can slide further and further into the trench 5 as the trench 5 is excavated to a deeper and deeper extent, and so the trench walls are always secured. The shoring walls 26, 27 can comprise end-face guide rails 34 in which the second shoring plate 33 is mounted so as to be displaceable in the vertical direction.

Figure 1B:
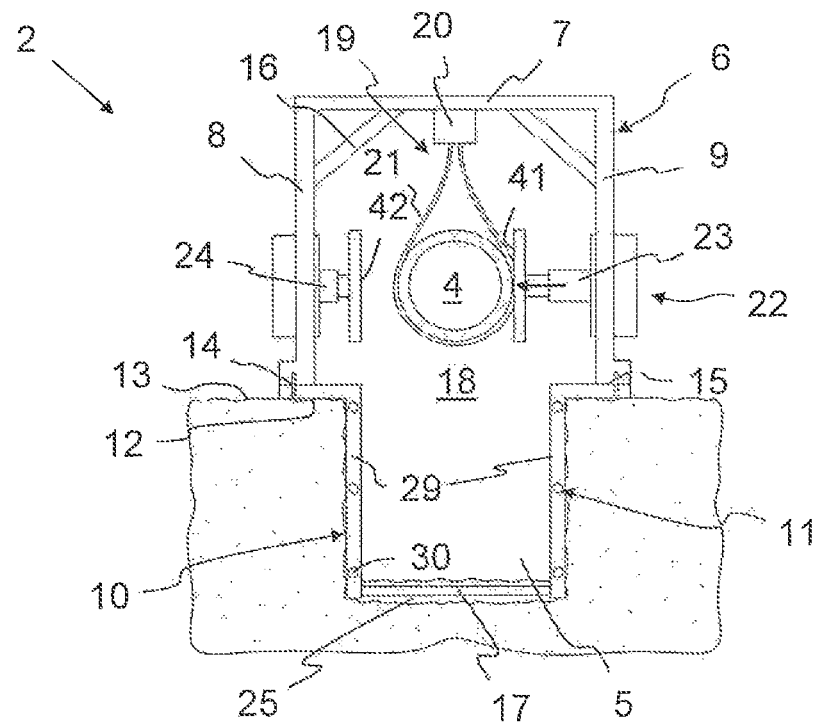
Figure 1C:
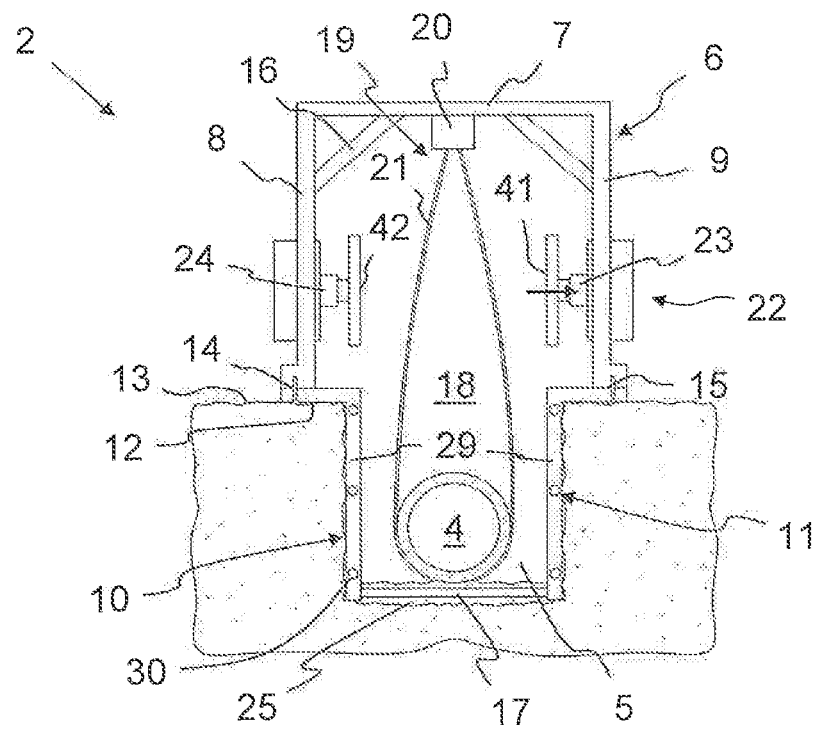

In one exemplary embodiment which is not represented here in FIG. 2, the supporting walls 11a, 11b (FIG. 3) of the supporting unit 2, which are represented in FIGS. 1a to 1c, can be designed as two pieces, similar to the shoring walls 26, 27 of the shoring unit 3 represented in FIG. 2, and, consequently, can each comprise a first shoring plate 31 and a second shoring plate 33. The two shoring plates 31, 33 of the supporting unit 2 can then be displaced with respect to one another, in a rail-guided manner, in the vertical direction of the trench. The preceding description, which relates to the shoring unit 3, can therefore also be transferred to the supporting walls 11a, 11b of the supporting unit 2 with respect to this aspect.

FIG. 3 shows a longitudinal section of the shoring system 1 comprising a first supporting unit 2a and a second supporting unit 2b. Multiple shoring units 3a-3d are situated between the two supporting units 2a, 2b which are spaced apart from one another in the longitudinal direction. Due to the cutaway view, only one of the two shoring walls 27 of each shoring unit 3a-3d is apparent in FIG. 3, wherein only one is provided with a reference sign, for the sake of clarity. The same applies for the two supporting units 2a, 2b, and so only one of the two supporting walls 11a, 11b is apparent in their case as well.

The first shoring unit 3a is detachably connected on the end face, in its fastening area 28, to the first supporting unit 2a in its fastening area 29. The first shoring unit 3a is detachably connected to the second shoring unit 3b on its side facing away from the first supporting unit 2a. This also takes place, on the end face, in their particular mutually corresponding fastening areas 28. The remaining shoring units 3b, 3c, 3d are also detachably connected to the particular adjacent shoring unit 3b, 3c, 3d and/or adjacent supporting unit 2b in their particular fastening area 28, 29.

The shoring walls 27 and supporting walls 11a, 11b represented in FIG. 3 therefore form one continuous wall supporting the trench 5 on one side. The transverse forces acting by way of the soil on the shoring walls 27 of the shoring units 3a-3d and supporting walls 11 of the supporting units 2a, 2b are absorbed via the two supporting frames 6a, 6b of the supporting units 2a, 2b and are supported with respect to the other half of the shoring system 1, which is not represented here. In this case, the transverse forces to be brought under control are absorbed, on both sides, in the transverse elements 7a, 7b of the two supporting units 2a, 2b. The shoring system 1 represented in FIG. 3 is therefore designed to be self-supporting and simultaneously comprises a barrier-free lowering space 18 which is formed between the supporting units 2a, 2b and shoring units 3a-3d in the vertical direction of the shoring system 1 and extends across the entire length of the shoring system 1 and within which the pipe 4 can be lowered from the area of the supporting frames 6a, 6b into the area of the supporting walls 11a, 11b and shoring walls 27.

The individual method steps for laying the pipe 4 along a curved trench course are illustrated in FIGS. 4a-4i. According to FIG. 4a, the shoring system 1 comprises five supporting units 2a-2e, between which one group of four shoring units 3a-3d is situated in each case. For the sake of clarity, not all shoring units 3 are provided with a reference sign.

According to FIG. 4a, the pipe 4 has already been lowered into the trench 5 in the area of the first and the second supporting units 2a, 2b. In this case, the pipe 4 lies on liquid soil 25 introduced into the trench 5. Behind the first supporting unit 2a, the pipe 4 has already been buried in soil 35. Proceeding from the second supporting unit 2b in the direction of the free pipe end 43, the pipe 4 extends out of the trench 5. In this case, the pipe 4 is held by the third, fourth, and fifth supporting units 2c, 2d, 2e with the aid of their particular lowering device 19 which is not represented here (cf. FIG. 1a).

According to FIG. 4a, a welding unit 36 is located in the area of the pipe end 43, with the aid of which a further pipe section 37 can be welded onto the pipe end. The welding unit 36 is displaceable in the longitudinal direction of the trench. Located at the end of the trench 5 is an excavator 38, with the aid of which the trench 5 is excavated along its course which is curved at least in some areas. Moreover, the device for carrying out the laying process according to FIG. 4a comprises a repositioning device 39, with the aid of which the supporting units 2a-2e and shoring units 3a-3d can be moved from the rear end of the shoring system 1 to its front end. The repositioning device 39 can be a gantry crane or a transport vehicle in this case.

According to FIG. 4b, the rearmost supporting frame 6a of the first supporting unit 2a is first moved into an intermediate parking position with the aid of the repositioning device 39. The intermediate parking position is located behind the welding unit 36, since the welding unit 36 cannot pass by the supporting frame 6a due to its size.

Thereafter, the two supporting walls 10a, 11a of the first supporting unit 2a are moved from the rear end of the shoring system 1 to the front end, according to FIG. 4c. After the displacement, the two supporting walls 10a, 11a are detachably connected to the adjacent shoring unit 3. Moreover, the trench is further filled at the rear end.

Thereafter, according to FIG. 4d, the rearmost shoring unit 3a is moved to the foremost end of the shoring system 1 and is detachably connected to the adjacent supporting walls 10a, 11a of the supporting unit 2a which was previously only partially displaced.

In the method step represented in FIG. 4e, the pipe 4 is extended by one further pipe section 37. For this purpose, one further pipe section 37 is retrieved from the pipe rack by the repositioning device 39 and is placed at the free pipe end 43 of the pipe 4. Before the welding is carried out, the pipe 4 can be aligned with respect to the pipe section 37 in the transverse direction with the aid of fourth and the fifth supporting units 2d, 2e, as indicated by the arrows. This takes place, as described above, with the aid of the alignment devices 22 (not represented here) of the particular supporting units 2d, 2e (cf. FIG. 1a).

While the welding unit 36 welds the further pipe section 37 to the free pipe end 43 of the pipe 4, the remaining rear shoring units 3b, 3c, 3d are moved one after the other, by the repositioning device 39, from the rear end to the front end and are connected to the particular adjacent unit, according to FIG. 4f. In the meantime, the pipe 4 is continuously buried in soil 35 and covered with an upper ballast layer 40 at the rear end of the shoring system 1. Moreover, the trench 5 is provided with the liquid soil 25 between the second supporting unit 2b and the third supporting unit 2c, into which the pipe 4 has not yet been lowered.

Thereafter, the welding unit 36 is moved to the new free pipe end 43, according to FIG. 4g. The welding unit 36 is now located ahead of the two supporting walls 10a, 11a of the first supporting unit 2a which has previously been only partially displaced. Moreover, the repositioning device 39 simultaneously moves into the intermediate parking position in which the supporting frame 6a of the first supporting unit 2a is parked.

Thereafter, according to FIG. 4h, the supporting frame 6a is moved from the intermediate parking position into the position of the supporting walls 10a, 11a belonging thereto, and is connected thereto.

In order to align the pipe 4 in relation to the trench 5 in the transverse direction before lowering, the pipe 4 according to FIG. 4h is displaced in the transverse direction of the trench by the supporting units 2c, 2d, 2e with the aid of the alignment devices 22 (not represented here), and so the pipe 4 is situated above the trench opening (cf. FIGS. 1a, 1b). After the pipe 4 has been aligned in relation to the trench 5, the pipe 4 can be lowered according to FIG. 4i, as indicated by the arrows. This takes place, according to the present exemplary embodiment, in the area of the third and the fourth supporting units 2c, 2d. After the pipe 4 has been aligned and lowered, the second supporting unit 2b is moved, wherein the method steps mentioned in FIGS. 4a-4i are implemented in a similar way.

The number of supporting units 2 and shoring units 3 is reduced for the sake of clarity. Preferably, the shoring system 1 comprises six supporting units 2, wherein preferably at least two of these supporting units 2 are provided for aligning the pipe 4 with respect to the trench 5 before lowering, and four supporting units 2 are provided for aligning the free pipe end 43 with respect to the pipe section 37 to be connected thereto. Moreover, at least three, preferably four shoring units 3 are situated between the particular supporting units 2.

The present invention is not limited to the exemplary embodiments which have been represented and described. Modifications within the scope of the claims are also possible, as is any combination of the features, even if they are represented and described in different exemplary embodiments.

LIST OF REFERENCE SIGNS 1 shoring system
2 supporting units
3 shoring units
4 pipe
5 trench
6 supporting frame
7 transverse element
8 first leg
9 second leg
10 first supporting wall
11 second supporting wall
12 first support surface
13 trench edge
14 first connection area
15 second connection area
16 reinforcements
17 support brace
18 barrier-free lowering space
19 lowering device
20 drive
21 lift belt
22 alignment device
23 first pressure piston
24 second pressure piston
25 liquid soil
26 first shoring wall
27 second shoring wall
28 first fastening area
29 second fastening area
30 fastener
31 first shoring plate
32 second support surface
33 second shoring plate
34 guide rail
35 soil
36 welding unit
37 pipe section
38 excavator
39 repositioning device
40 ballast layer
41 first pressure surface
42 second pressure surface
43 free pipe end

The invention claimed is:

1. A supporting unit for a self-supporting shoring system for laying pipe in a trench that defines an interior that elongates along a longitudinal direction and that defines a trench edge at an entrance to an interior that defines a lowering space of the trench, the supporting unit comprising:

a supporting frame configured for being situated at least partially outside the trench and extending in a transverse direction which is perpendicular to the longitudinal direction, wherein the supporting frame including a first leg and a second leg spaced apart from the first leg in the transverse direction, each of the first leg and the second leg elongating in a vertical direction that is perpendicular to each of the transverse direction and the longitudinal direction, wherein the supporting frame is configured to bridge over the pipe when the pipe is situated outside and above the trench before the pipe is lowered into the trench, a first supporting wall and a second supporting wall spaced apart from the first supporting wall in the transverse direction of the supporting frame, each of the first supporting wall and the second supporting wall elongating in the vertical direction;

wherein the first leg rests on the first supporting wall and is supported above the first supporting wall in the vertical direction and is detachably connected onto the first supporting wall, wherein the second leg rests on the second supporting wall and is supported above the second supporting wall in the vertical direction and being detachably connected onto second supporting wall, and wherein the supporting frame and the first and second supporting walls are configured so that the supporting frame and the first and second supporting walls together define a barrier-free lowering space within which the pipe can be lowered from the supporting frame into the interior of the trench between the first and second supporting walls; and wherein each of the supporting walls includes a first support segment extending in the transverse direction and defining a first support surface, with the aid of which the supporting walls can be placed on the trench edge, wherein each of the first support segments is configured to be situated on a side of the respective supporting wall facing away from the lowering space and at an end of the respective one of the supporting walls facing the supporting frame, and so configuring each of the supporting walls to assume an essentially L-shaped cross-section.

2. The supporting unit as claimed in claim 1, further comprising a support brace that elongates between a first end and a second end, wherein the first supporting wall has a proximal end that is detachably connected to the supporting frame, wherein the first supporting wall has a distal end that is spaced apart from the proximal end and connected to the first end of the support brace, wherein the second supporting wall has a proximal end that is detachably connected to the supporting frame, wherein the second supporting wall has a distal end that is spaced apart from the proximal end of the second supporting wall and connected to the second end of the support brace.

3. The supporting unit as claimed in claim 2, wherein the first end of the support brace is configured with a first selectively detachable connection to the distal end of the first supporting wall, the second end of the support brace is configured with a second selectively detachable connection to the distal end of the second supporting wall, whereby the support brace is configured to be rendered expendable by remaining in the trench after laying the pipe therein.

4. The supporting unit as claimed in claim 1, wherein the first leg of the supporting frame is detachably connected onto the first support segment of the first supporting wall and the second leg of the supporting frame is detachably connected onto the first support segment of the second supporting wall.

5. The supporting unit as claimed in claim 1, further comprising a lowering device situated on the supporting frame and configured for lowering the pipe into the trench, wherein the lowering device includes a lift belt.

6. The supporting unit as claimed in claim 1, further comprising an alignment device situated on the supporting frame and configured for displacing the pipe in relation to the supporting unit in the transverse direction for alignment with respect to the trench.

7. The supporting unit as claimed in claim 6, wherein the alignment device comprises two pressure pistons which face one another and are displaceable in the transverse direction of the supporting unit.

8. The supporting unit as claimed in claim 7, wherein each of the two pressure pistons is configured so as to be displaceable from a retracted neutral position into a pressure position, which is closer to the other pressure piston.

9. The supporting unit as claimed in claim 1, further comprising an alignment device situated on the supporting frame and configured for displacing in the transverse direction in relation to the supporting unit for alignment with respect to the trench, a pipe section that is outside the trench.

10. A shoring system that elongates along a longitudinal direction and configured for trench shoring for a lowerable pipe to a trench floor within an interior of a trench defined in part by a pair of trench walls spaced apart from each other in a transverse direction that is perpendicular to the longitudinal direction, the shoring system comprising:
    two supporting units which are spaced apart from one another in the longitudinal direction of the shoring system and are intended for absorbing forces that act in the transverse direction, wherein each of the two supporting units includes a supporting frame which can be situated at least partially outside the trench and has a first side spaced apart in the transverse direction from a second side, each supporting frame including a transverse element extending in the transverse direction between a first end spaced apart from a second end situated outside and above the trench and from which the pipe can be lowered into the trench, each supporting frame including two supporting walls which can be situated at least partially in the interior of the trench and spaced apart from one another in the transverse direction of the respective supporting frame, wherein a respective one of each of the supporting walls being connected to a respective one of the two sides of the supporting frame, and each of the supporting frame and the two supporting walls together defining a barrier-free lowering space within which the pipe can be lowered from the transverse element of the respective supporting frame into the interior of the trench between the respective supporting walls;
    a support brace that elongates between a first end and a second end, wherein a first one of the two supporting walls has a proximal end that is detachably connected to the supporting frame, wherein the first one of the two supporting walls has a distal end that is spaced apart from the proximal end and connected to the first end of the support brace, wherein a second one of the two supporting walls has a proximal end that is detachably connected to the supporting frame, wherein the second one of the two supporting walls has a distal end that is spaced apart from the proximal end of the second one of the two supporting walls and connected to the second end of the support brace; and
    a shoring unit which is situated between the two supporting units and is configured for supporting the trench wall, and
    wherein the two supporting units form, together with the shoring unit, a barrier-free lowering space within which the pipe can be lowered from an area located outside the trench to the trench floor.

11. The shoring system as claimed in claim 10, wherein each shoring unit includes an end face disposed at each opposite end thereof and is displaceable from and is detachably connected, in the area of each of the two end faces of each shoring unit, to an adjacent supporting unit or to a further shoring unit.

12. The shoring system as claimed in claim 10, wherein the shoring unit comprises two shoring walls which can be situated at least partially in the interior of the trench, are spaced apart from each other in the transverse direction of the shoring unit.

13. The shoring system as claimed in claim 12, wherein each of the shoring walls defines an end-face impact surface disposed at each opposite end thereof that is detachably connected to the particular supporting wall of the supporting unit adjacent in the longitudinal direction or to a shoring wall of an adjacent shoring unit.

14. The shoring system as claimed in claim 12, wherein each of the shoring walls includes a second support surface, with the aid of which each respective one of the shoring walls can be placed on an edge of the trench.

15. The shoring system as claimed in claim 14, wherein each of the shoring walls includes two shoring plates which are displaceable with respect to one another in a vertical direction that is perpendicular to both the longitudinal direction and to the transverse direction wherein one of the two shoring plates includes the second support surface configured for resting on the edge of the trench.

16. A method for laying a flexible plastic pipe elongating between a first end and a second end in a trench that is excavated along a trench course in a longitudinal direction and defines a trench floor beneath a lowering section of the trench defined by trench walls spaced apart in a transverse direction, which is perpendicular to the longitudinal direction, the method comprising the steps of:
    disposing at the site of the trench a shoring system which has a holding section, a front end and a rear end and a barrier-free lowering space between the front end and the rear end and includes a plurality of displaceable supporting units and shoring units between the front end and the rear end;
    lowering the flexible plastic pipe within the barrier-free lowering space of the shoring system, from a lift position to the trench floor while simultaneously holding a free end of the flexible plastic pipe in the lift position in the holding section of the shoring system;
    displacing a supporting unit having a supporting frame with two supporting walls and moving the supporting frame of the supporting unit into an intermediate parking position which is located behind a welding unit,
    thereafter, moving the two supporting walls of the supporting unit ahead of the welding unit to the front end of the shoring system, and
    using the welding unit to weld a new pipe end of a pipe section to the free end of the flexible plastic pipe and thereafter moving the welding unit to the new pipe end; and
    moving the supporting frame from the intermediate parking position to the two supporting walls after the welding unit has welded the new pipe end of the pipe section to the free end of the flexible plastic pipe and has been moved further to the new pipe end.

17. The method as claimed in claim 16, wherein after the pipe has been lowered essentially to the trench floor, then the supporting units and the shoring units situated in the lowering section are moved to the holding section, wherein the supporting unit or shoring unit forming the rear end of the shoring system is gradually moved to the front end of the shoring system.

18. The method as claimed in claim 16, wherein the pipe of at least one supporting unit situated in the lowering section is aligned in relation to the trench course in the transverse direction of the trench with the aid of an alignment device before the lowering of the pipe essentially to the trench floor.

* * * * *